(12) United States Patent
Owen et al.

(10) Patent No.: US 7,877,210 B2
(45) Date of Patent: Jan. 25, 2011

(54) SYSTEM AND METHOD FOR PROJECTING B-REP OUTLINES TO DETECT COLLISIONS ALONG A TRANSLATIONAL PATH

(75) Inventors: John Owen, Cambridge (GB); Haralabos Gouzinis, Cambridge (GB)

(73) Assignee: Siemens Industry, Inc., Alpharetta, GA (US)

( * ) Notice: Subject to any disclaimer, the term of this patent is extended or adjusted under 35 U.S.C. 154(b) by 903 days.

(21) Appl. No.: 11/622,349

(22) Filed: Jan. 11, 2007

(65) Prior Publication Data

US 2008/0172134 A1   Jul. 17, 2008

(51) Int. Cl.
*G05B 13/04* (2006.01)
(52) U.S. Cl. ............................. 701/301; 700/31; 700/69; 700/98; 700/182
(58) Field of Classification Search .................. 700/31, 700/182, 69, 98; 701/301
See application file for complete search history.

(56) References Cited

U.S. PATENT DOCUMENTS

| | | | | |
|---|---|---|---|---|
| 2,207,919 A * | 7/1940 | Harrison | ...................... | 353/121 |
| 5,280,431 A * | 1/1994 | Summerville et al. | .......... | 701/24 |
| 5,415,549 A * | 5/1995 | Logg | ............................ | 434/38 |
| 5,465,221 A * | 11/1995 | Merat et al. | .................... | 702/83 |
| 5,828,575 A * | 10/1998 | Sakai | ......................... | 700/182 |
| 6,510,244 B2 * | 1/2003 | Proesmans et al. | .......... | 382/203 |
| 6,765,566 B1 * | 7/2004 | Tsao | ........................... | 345/419 |
| 2002/0095236 A1 * | 7/2002 | Dundorf | ..................... | 700/182 |
| 2002/0133264 A1 * | 9/2002 | Maiteh et al. | ............... | 700/182 |
| 2002/0190982 A1 * | 12/2002 | Kotcheff et al. | ............. | 345/420 |
| 2003/0076319 A1 * | 4/2003 | Hiraga | ........................ | 345/420 |
| 2003/0204285 A1 * | 10/2003 | Thomas et al. | .............. | 700/182 |
| 2003/0204286 A1 * | 10/2003 | Thomas et al. | .............. | 700/182 |
| 2004/0095343 A1 * | 5/2004 | Forest et al. | ................ | 345/419 |
| 2005/0149231 A1 * | 7/2005 | Pretlove et al. | ............. | 700/264 |
| 2009/0096785 A1 * | 4/2009 | Gobel et al. | ................ | 345/421 |

* cited by examiner

*Primary Examiner*—Khoi Tran
*Assistant Examiner*—Kyung J Kim
(74) *Attorney, Agent, or Firm*—Michael J. Wallace, Jr.

(57) ABSTRACT

A system, method, and computer program for detecting collisions in a three-dimension environment, comprising the steps of establishing a projection path along a translational path of a first object toward a second object; projecting a first object outline from said first object with a second object outline from said second object to obtain an intersection; calculating a collision along said translational path from said intersection of said first object outline and said second object outline; and checking for a static collision between said first object and said second object at an end of said translational path and appropriate means and computer-readable instructions.

12 Claims, 7 Drawing Sheets

SYSTEM AND METHOD FOR PROJECTING B-REP OUTLINES TO DETECT COLLISIONS ALONG A TRANSLATIONAL PATH

TECHNICAL FIELD

The presently preferred embodiment of the innovations described herein relate generally to three-dimensional models. More specifically, the presently preferred embodiment relates to detecting collisions of a b-rep model moving along a translational path.

BACKGROUND

Computer aided drafting (CAD) systems allow engineers to design three dimensional geometric models. These systems contain a wide range of tools that assist with building models from scratch. Included in these tools is the ability to simulate the movement of virtual components along a virtual path in a virtual world with as much realism as the physical components move along a physical path in a physical world. In these simulations, algorithms often calculate collision detection to determine when at least two given solids will impact and where those impact points are. Dynamic collision detection on exact models is becoming more and more relevant in CAx environments. A typical example is the toolpath checking feature in machining applications with numerous linear segments.

What is needed is a method providing a fast and accurate method for detecting collisions along linear segments to lead to significant improvements in the overall performance and reliability.

SUMMARY

To achieve the foregoing, and in accordance with the purpose of the presently preferred embodiment as broadly described herein, the present application provides a method for detecting collisions in a three-dimension environment, comprising the steps of establishing a projection path along a translational path of a first object toward a second object; projecting a first object outline from said first object with a second object outline from said second object to obtain an intersection; calculating a collision along said translational path from said intersection of said first object outline and said second object outline; and checking for a static collision between said first object and said second object at an end of said translational path. The method, wherein one of said first object and second object is a solid model. The method, wherein one of said first object and second object is in a boundary represented geometry. The method, wherein said first object is in transit. The method, wherein said second object is static.

Another advantage of the presently preferred embodiment is to provide a computer-program product tangibly embodied in a machine readable medium to perform method for detecting collisions in a three-dimension environment, comprising instructions for establishing a projection path along a translational path of a first object toward a second object; instructions for projecting a first object outline from said first object with a second object outline from said second object to obtain an intersection; instructions for calculating a collision along said translational path from said intersection of said first object outline and said second object outline; and instructions for checking for a static collision between said first object and said second object at an end of said translational path. The computer-program product, wherein one of said first object and second object is a solid model. The computer-program product, wherein one of said first object and second object is in a boundary represented geometry. The computer-program product, wherein said first object is in transit. The computer-program product, wherein said second object is static.

And another advantage of the presently preferred embodiment is to provide a data processing system having at least a processor and accessible memory to implement a method for detecting collisions in a three-dimension environment, comprising means for establishing a projection path along a translational path of a first object toward a second object; means for projecting a first object outline from said first object with a second object outline from said second object to obtain an intersection; means for calculating a collision along said translational path from said intersection of said first object outline and said second object outline; and means for checking for a static collision between said first object and said second object at an end of said translational path.

Yet another advantage of the presently preferred embodiment is to provide a method for detecting collisions along a translational path, comprising the steps of finding a first outline of a first object, and a second outline of a second object; finding intersections-in-view with said first outline and said second outline; checking for a static collision between said first object and said second object.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 9:
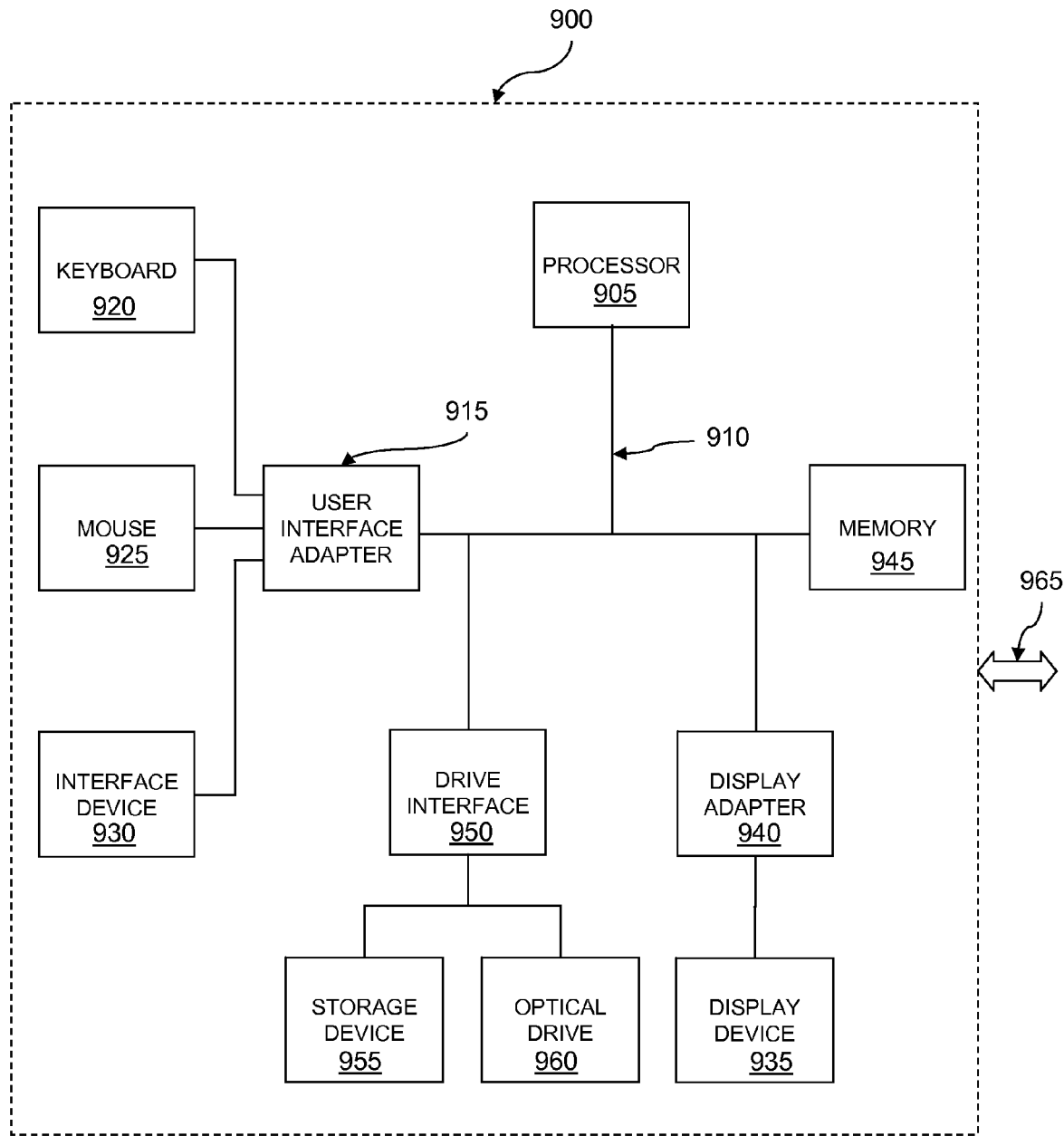
FIG. 9 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for detecting collisions of a b-rep model moving along a translational path. Now therefore, in accordance with the presently preferred embodiment, an operating system executes on a computer, such as a general-purpose personal computer. FIG. 9 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 9, an exemplary system for implementing the presently preferred embodiment includes a general-purpose computing device in the form of a computer 900, such as a desktop or laptop computer, including a plurality of related peripheral devices (not depicted). The computer 900 includes a microprocessor 905 and a bus 910 employed to connect and enable communication between the microprocessor 905 and a plurality of components of the computer 900 in accordance with known techniques. The bus 910 may be any of several types of bus structures including a memory bus or memory controller, a peripheral bus, and a local bus using any of a variety of bus architectures. The computer 900 typically includes a user interface adapter 915, which connects the microprocessor 905 via the bus 910 to one or more interface devices, such as a keyboard 920, mouse 925, and/or other interface devices 930, which can be any user interface device, such as a touch sensitive screen, digitized pen entry pad, etc. The bus 910 also connects a display device 935, such as an LCD screen or monitor, to the microprocessor 905 via a display adapter 940. The bus 910 also connects the microprocessor 905 to a memory 945, which can include ROM, RAM, etc.

The computer 900 further includes a drive interface 950 that couples at least one storage device 955 and/or at least one optical drive 960 to the bus. The storage device 955 can include a hard disk drive, not shown, for reading and writing to a disk, a magnetic disk drive, not shown, for reading from or writing to a removable magnetic disk drive. Likewise the optical drive 960 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 900.

The computer 900 can communicate via a communications channel 965 with other computers or networks of computers. The computer 900 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 945 of the computer 900. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System

Figure 1:
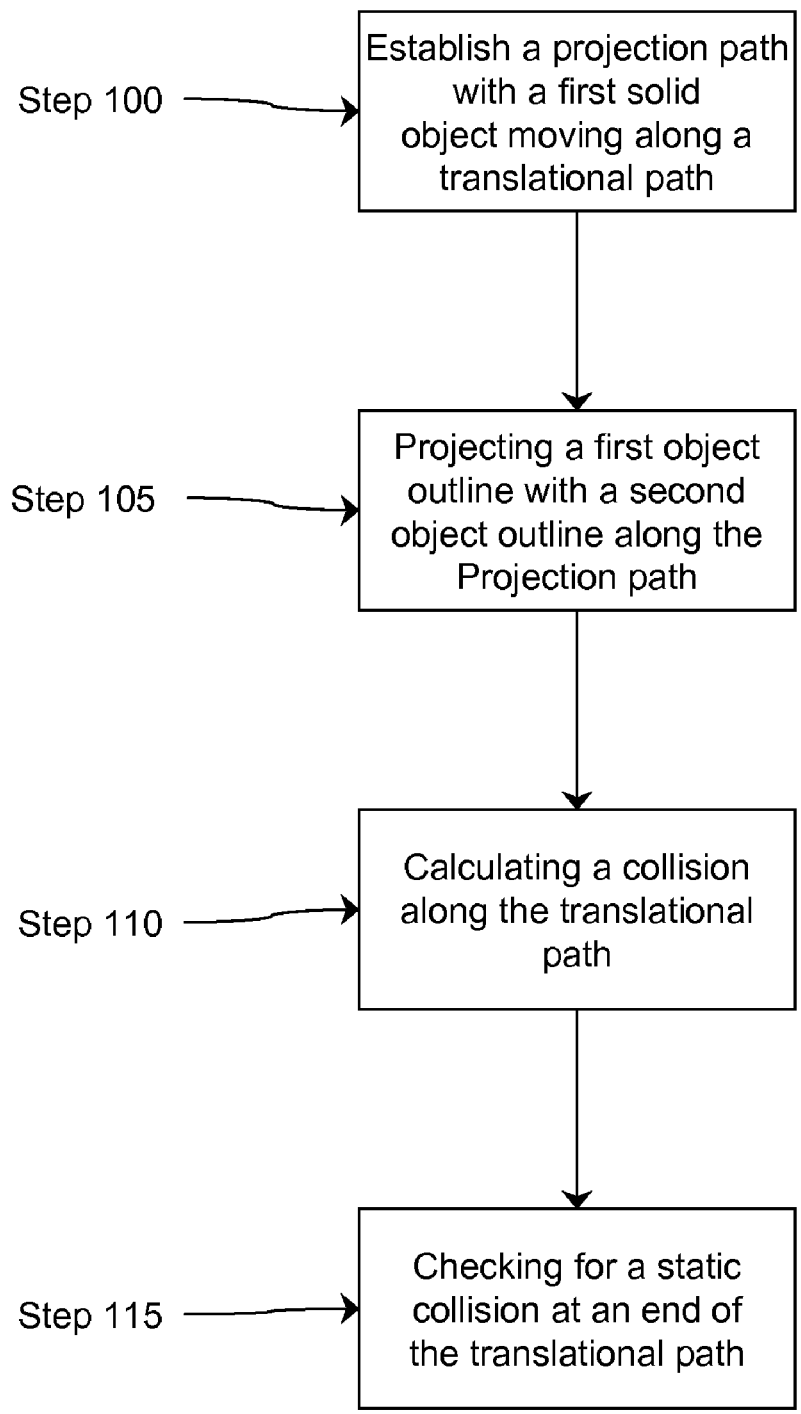
FIG. 1 is a logic flow diagram of the method employed by the presently preferred embodiment.

FIG. 1 is a logic flow diagram of the method employed by the presently preferred embodiment. Referring to FIG. 1, the presently preferred embodiment discloses a method for detecting collisions of a b-rep model moving along a translational path that begins with at least two solid objects. Beginning with establishing a projection path having a first solid object moving along a translational path (Step 100). Next an outline, or silhouette, from the first solid object is projected down the projection path to obtain a potential projected intersection (Step 105). Then a collision detection is calculated using the potential projected intersections along the translational path (Step 110). Regardless of detected collisions at the end of the translational path and check for status collisions is conducted (Step 115).

Figure 2:
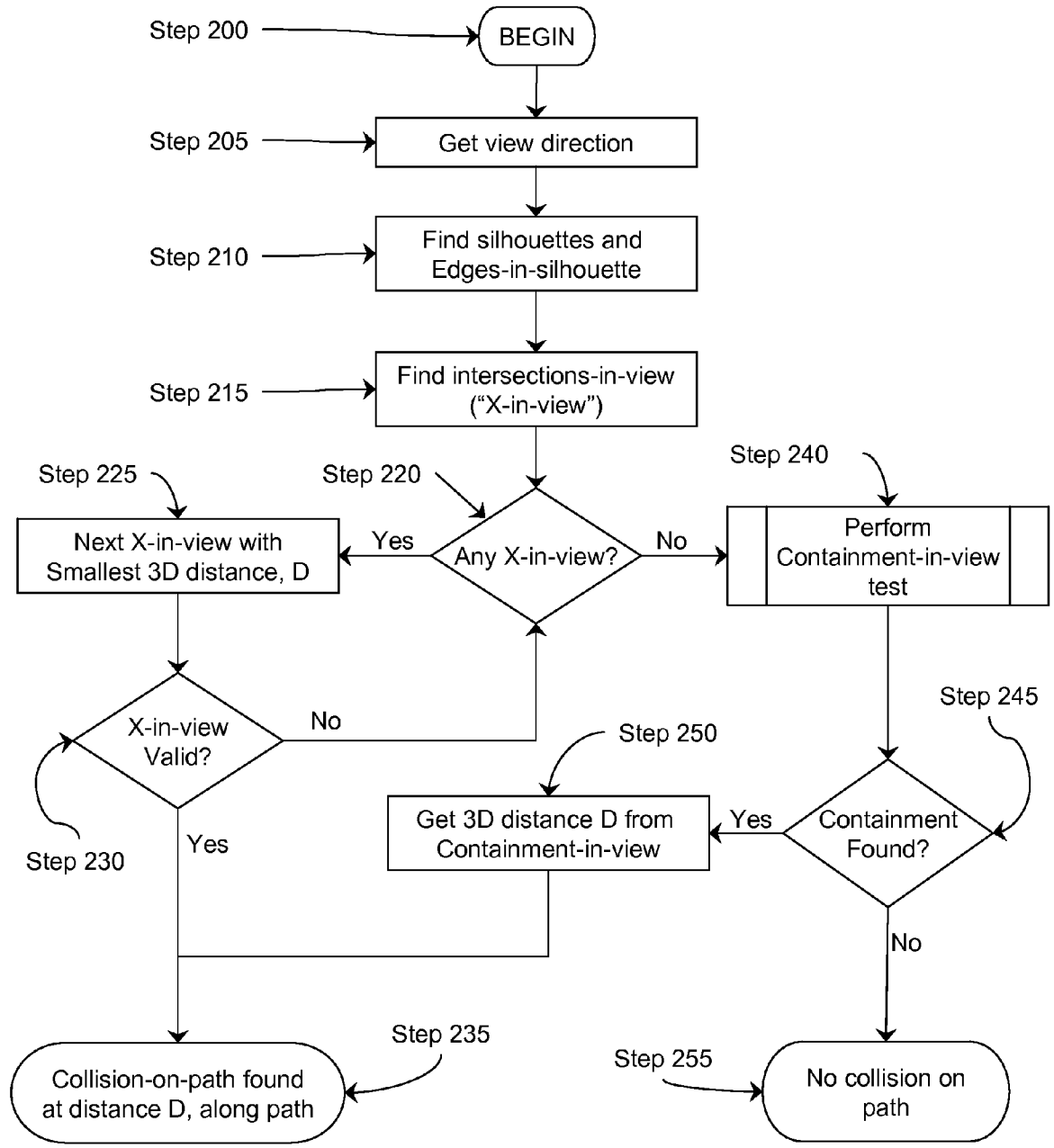
FIG. 2 is a more detailed data flow diagram of the method employed by the presently preferred embodiment.

FIG. 2 is a more detailed data flow diagram of the method employed by the presently preferred embodiment. The method disclosed preferably computes hidden line views in a three-dimensional (3D) solid model, such as D-Cubed's HLM available by UGS Corp. The HLM program is compatible with a variety of geometric modelers, and calculates hidden line views, engineering drawings, and technical illustrations of parts and assemblies. Further to the disclosed embodiment is the ability to indicate a translational path along which a 3D part and/or component will travel from a start position to an end position. Referring now to FIG. 2, the user determines the translational path of a solid model object from a first point to a second point (Step 200). The 3D CAD application establishes a projection path in a view direction based on traveling the translational path from the first point to the second point (Step 205). Utilizing the Hidden Line Manager, a plurality of silhouettes, outlines, and/or silhouette edges are determined for the solid model (Step 210). Once the silhouettes, outlines, and/or silhouette edges are found and determined for the solid mode, intersections-in-view (discussed in more detail below) are ascertained (Step 215). If there are any intersections-in-view (Step 220), then proceed to a next intersection-in-view with a smallest 3D distance, D (Step 225). Next if the intersection-in-view is valid (Step 230), then a collision-on-path is found at the distance D, along the translational path (Step 235). If the intersection-in-view is not valid (Step 230), then return to Step 220 to query if there are more intersections-in-view (Step 220). If more intersections-in-view exist, then continue with Step 225, as discussed.

If there are no intersections-in-view, or no more intersections-in-view (Step 220), then perform a containment-in-view (discussed in more detail below) test (Step 240). If a containment-in-view is found (Step 245), then get the 3D distance D from the containment-in-view test (Step 250) and the collision-on-path is found at the distance D, along the translational path (Step 235). If, however, no containment-in-view was found (Step 245), then there is no collision-on-path (Step 255).

Operation

Figure 3A:
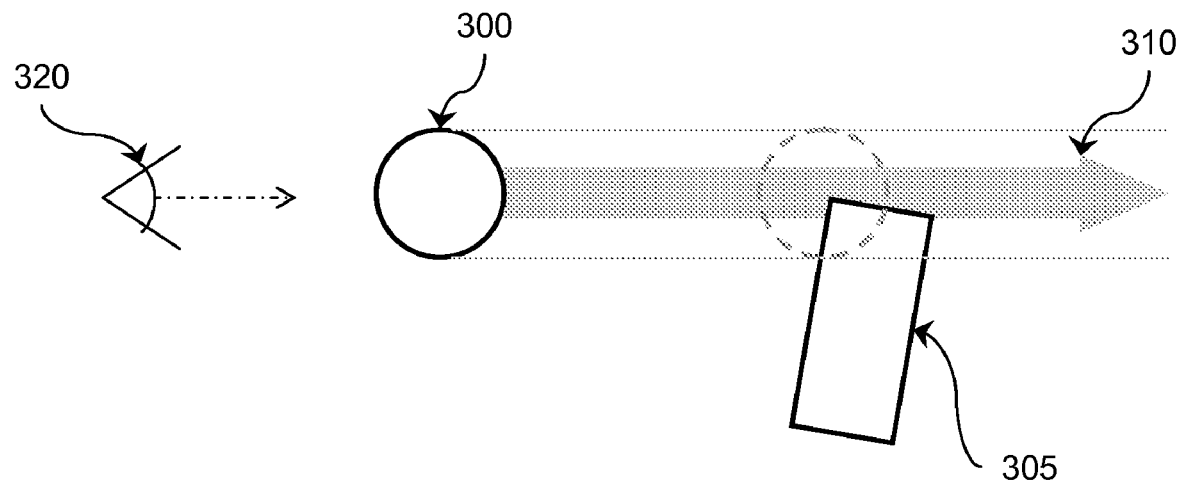
FIGS. 3a and 3b are views of a body moving toward a static body.
Figure 3B:
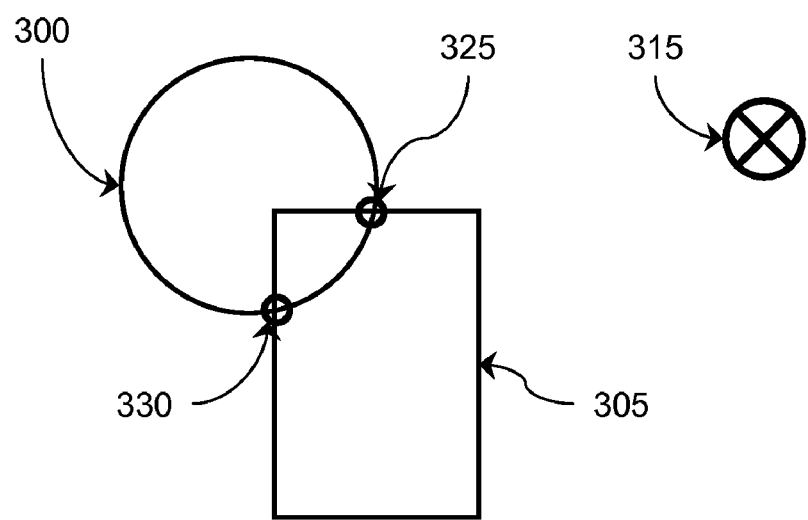

FIGS. 3a and 3b are views of a body moving toward a static body. Referring to FIG. 3a, a transitory body 300 moves towards a static body 305. The trajectory of the transitory body 300 is a translational path 310. Referring to FIG. 3b, A viewing direction 315 is defined as a unit vector along the translational path 310 (in this illustration denoted as pointing into the viewing plane). The viewing direction 315 looks down the translational path 310 from an infinite distance at an eye point 320 to create a parallel projection in the direction of the translational path 310. An implied projection plane is perpendicular to the viewing direction 315, therefore making the projection orthographic. According to the orthographic projection, the transitory body 300 and the static body 305 are represented on the projection plane by a projection of their outlines. The outlines of the respective bodies intersect at a first intersection point 325 and a second intersection point 330. The intersection points (325,330), are also referred to as "intersections-in-view." The transitory body 300 intersects the static body 305 in the referenced figure.

Figure 4:
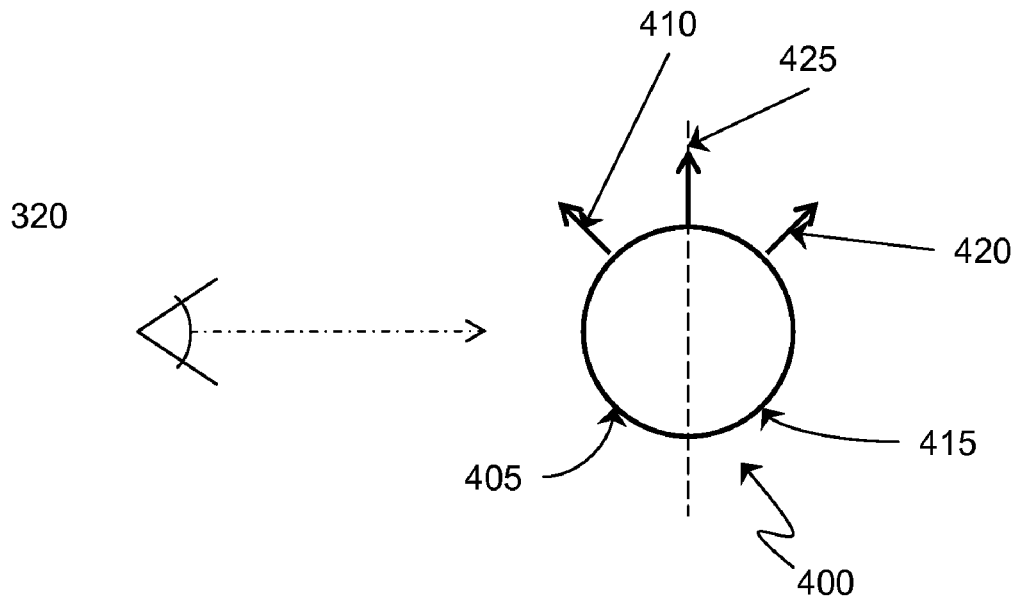
FIG. 4 is a sphere under parallel projection.

FIG. 4 is a sphere under parallel projection. Referring to FIG. 4, the sphere consists of a spherical face 400 and no edges, as understood in b-rep terminology. When viewed from the eye point 320, the spherical face 400 can be split into two parts: a front-facing part 405, where a front-face normal vector 410 points towards the eye point 320, and a back-facing part 415, where a back-face normal 420 points away from the eye point 320. A silhouette edge 425 is defined as the locus of points on a face where the face normal is perpendicular to the view direction 315. The silhouette edge 425 lies between the front-facing part 405 and the back-facing part 415. In the case of the complete sphere referenced in FIG. 4, the silhouette edge 425 is a great circle perpendicular to the direction of the eye point 320.

Figure 5A:
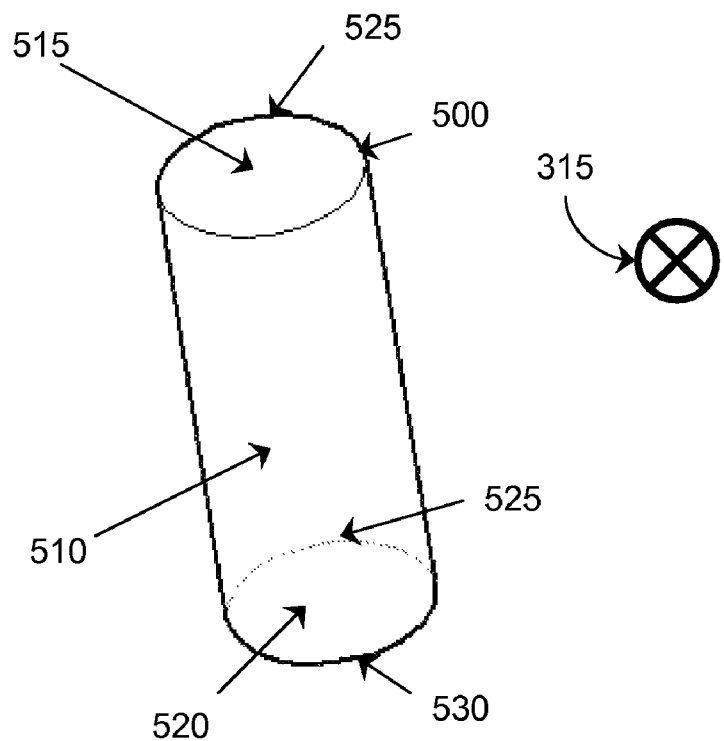
FIGS. 5a and 5b are illustrations of a cylinder and a block both of which have edges, unlike a sphere that is only a face.
Figure 5B:
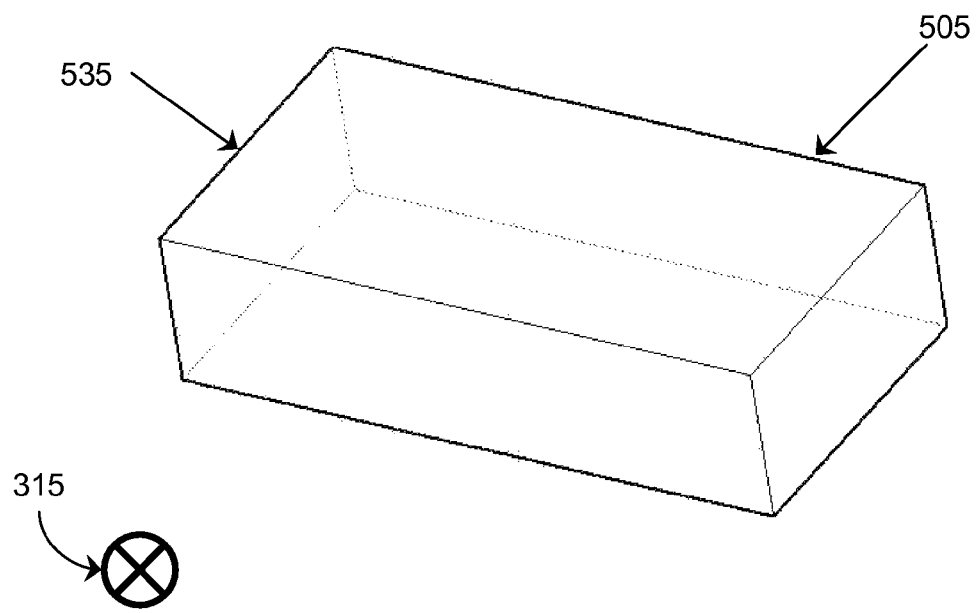

FIGS. 5a and 5b are illustrations of a cylinder 500 and a block 505 both of which have edges and faces, unlike a sphere that is only a face and no edges. In solid bodies having edges, a face may be entirely front-facing or back-facing, in which case those faces would have no silhouettes. Likewise a front-facing face may join with a back-facing face at an edge, referred to as an edge-in-silhouette. Referring to FIG. 5a, the cylinder 500 has a cylindrical face 510 joined with a top planar face 515 and a bottom planar face 520 via two circular edges 525. The cylindrical face 510 has two linear silhouette edges 425. Each one of the circular edges 525 has one part in silhouette. For example, a bottom edge 530 has its front part in silhouette, because it separates the front-facing cylindrical face 510 from the back-facing bottom planar face 520. FIG. 5b shows the same linear edges entirely in silhouette, e.g. at 535. Both FIGS. 5a and 5b also show the edges or edge segments that are hidden (by the rest of the body). For a given body, the collection of silhouette edges and edge segments in silhouette is called the body's outline.

Figure 6:
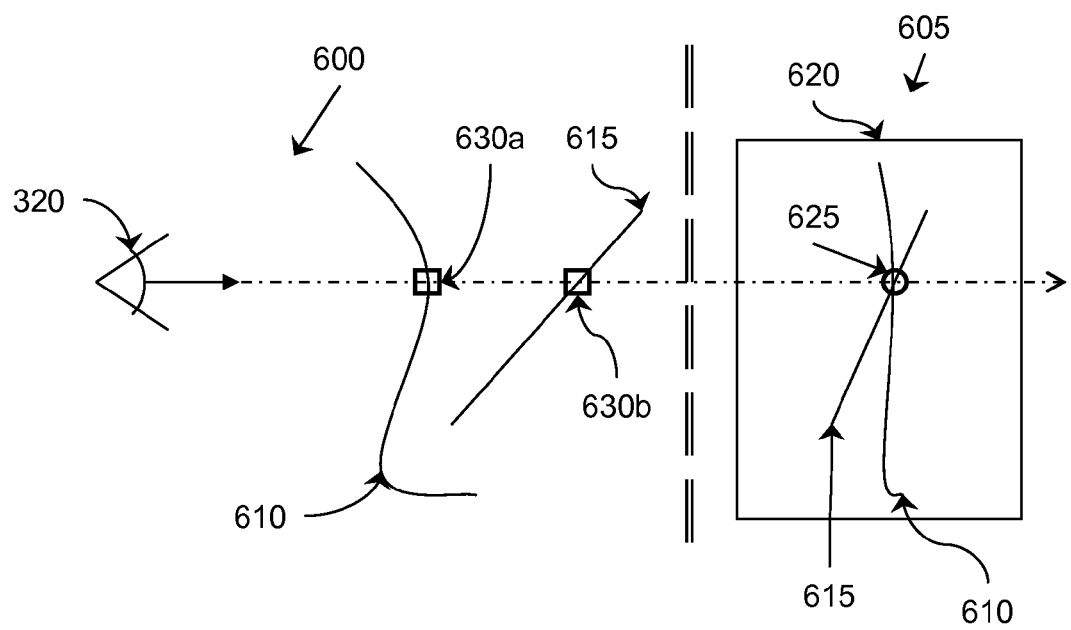
FIG. 6 is a view that combines both a parallel projection view with a projection plane view.

FIG. 6 is a view that combines both a parallel projection view 600 with a projection plane view 605. Referring to FIG. 6, a first body outline 610 is projected with a second body outline 615 onto a projection plane 620 to obtain an intersection point 625. The intersection point 625 is mapped back to original 3d edges 630a and 630b. In general, each intersection-in-view gives a single pair of mapped 3d points, one on each edge. There are cases however where this mapping can be one-to-many: one intersection in view may correspond to more than one pair of mapped 3d points.

Figure 7:
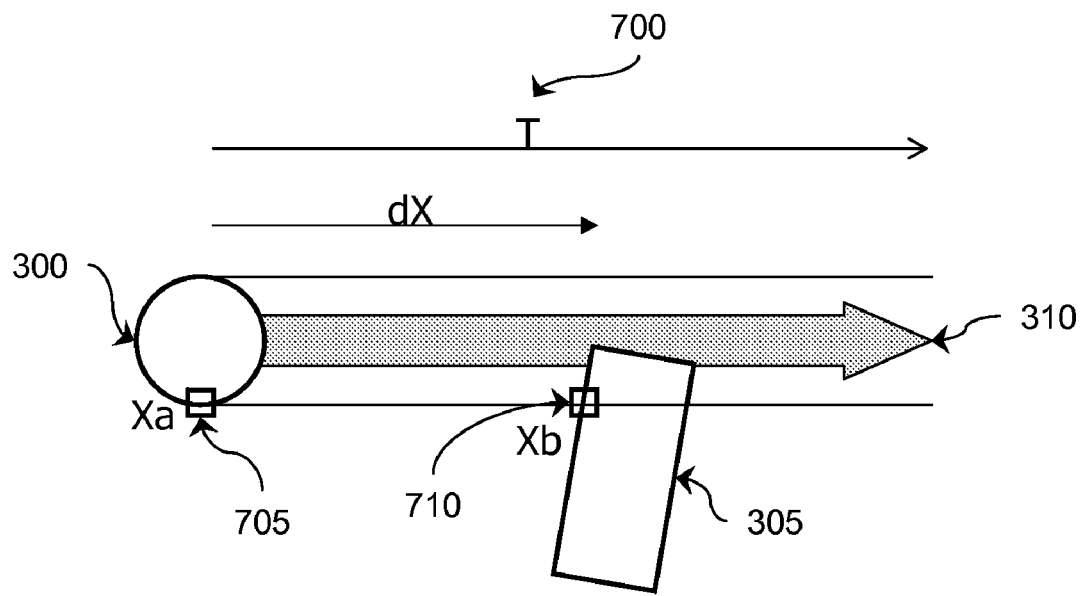
FIG. 7 is a view of a transitory body moving toward a static body where intersections-in-view lead to the detection of collisions on the translational path.

FIG. 7 is a view of a transitory body moving toward a static body where intersections-in-view lead to the detection of collisions-on-path (or collisions on the translational path). Referring to FIG. 7, the information regarding intersections-in-view is used to find collisions on the translational path 310 where T is a translation vector 700 defining the translational path 310, Xa 705 and Xb 710 are the intersections-in-view mapped back to the 3d bodies (as described in FIG. 6, above). Let dX=Xb−Xa. If T is the translation vector 700 defining the translational path 310, for a collision to exist on the translational path the following conditions have to be satisfied: (i) dX has to point in the same direction as T and (ii) the length of dX has to be smaller than the length of T. From the stated conditions, collisions on the translational path 310 can exist without outlines intersecting; for example, when one outline is contained within the other. That begin said, when no intersections-in-view (condition not depicted) are found an additional check is required by casting a ray from an arbitrary point on the transitory body 300 at Xa' and along the direction of the translational path 310; if the ray intersects the static body 305 at Xb', then define dX=Xb'−Xa' and require conditions (i) and (ii) to hold. A second ray needs to be cast from the static body 305 back to the transitory body 300 to complete this check.

Figure 8:
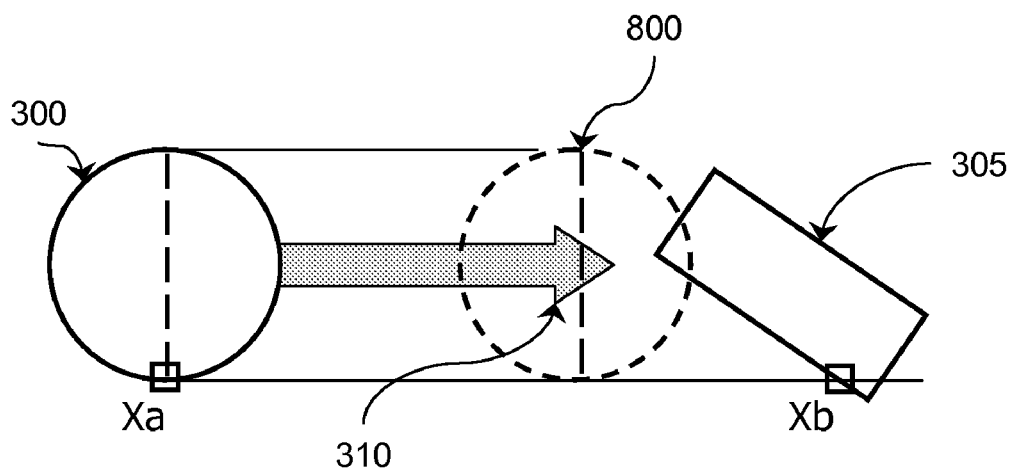
FIG. 8 is a parallel view of bodies that will collide at the end of the translational path.

FIG. 8 is a parallel view of bodies that will collide at the end of the translational path. Referring to FIG. 8, explicitly position the transitory body 300 at an end 800 of the translational path 310 and check for static collisions. The check for static collisions is done as a last step of the presently preferred embodiment, regardless of the detection of collisions on path. Similarly, the transitory body 300 may already be colliding at the start of the translational path 310 and the analysis based on the intersection-in-view might miss that. Again, a static collision detection call at the start of the path as the first step of the algorithm will catch this case; or, a requirement has to be set for body A to start from a non-colliding position. For example, where collisions on path exist multiple intersections in view and (Xa, Xb) pairs will exist. From all dX satisfying (i) and (ii) then, the dX with the smallest length is returned. The returned dX indicates the position of the first collision on the translational path 310. Given the position of first collision on path, find the touching position along the translational path 310, that is the position in which the objects may touch by do not overlap into a collision right before the first collision occurs (typically by iterating between colliding and non-colliding positions and reducing the step size gradually until the contact criteria are satisfied). The touching position is the first contact, i.e., when no other collision exists between this position and the beginning of the translational path 310.

CONCLUSION

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment, such as using static collisions down the projection path, or using static collisions and a minimum distance down the projection path. Likewise, swept volumes could be used instead of intersections-in-view, as could treating dynamic collisions through extruded volumes that combine swept volumes and temporal information. Or other approaches could use trajectory parameterizations in order to express the problem in an algebraic form, or the models could be tessellated to improve computational efficiencies by maintaining a less than perfect model definition. Therefore, other implementations are within the scope of the following claims.

What is claimed is:

1. A method for detecting collisions in a three-dimension environment represented in a computer, comprising the steps of:
   establishing a projection path along a translational path of a first object toward a second object by the computer;
   projecting a first object outline from said first object and a second object outline from said second object onto a projection plane by the computer to obtain an intersection of the first object outline and the second object outline on the projection plane;
   calculating a collision along said translational path from said intersection of said first object outline and said second object outline on the projection plane by the computer; and
   checking for a static collision between said first object and said second object at an end of said translational path by the computer.

2. The method of claim 1, wherein one of said first object and second object is a solid model.

3. The method of claim 1, wherein one of said first object and second object is in a boundary represented geometry.

4. The method of claim 1, wherein said first object is in transit.

5. The method of claim 1, wherein said second object is static.

6. A computer-program product tangibly embodied in a machine readable medium to perform method for detecting collisions in a three-dimension environment, comprising:
   instructions for establishing a projection path along a translational path of a first object toward a second object;
   instructions for projecting a first object outline from said first object and a second object outline from said second object onto a projection plane to obtain an intersection of the first object outline and the second object outline on the projection plane;
   instructions for calculating a collision along said translational path from said intersection of said first object outline and said second object outline on the projection plane; and
   instructions for checking for a static collision between said first object and said second object at an end of said translational path.

7. The computer-program product of claim 6, wherein one of said first object and second object is a solid model.

8. The computer-program product of claim 6, wherein one of said first object and second object is in a boundary represented geometry.

9. The computer-program product of claim 6, wherein said first object is in transit.

10. The computer-program product of claim 6, wherein said second object is static.

11. A data processing system having at least a processor and accessible memory to implement a method for detecting collisions in a three dimension environment, comprising:
   means for establishing a projection path along a translational path of a first object toward a second object;
   means for projecting a first object outline from said first object and a second object outline from said second object onto a projection plane to obtain an intersection of the first object outline and the second object outline on the projection plane;
   means for calculating a collision along said translational path from said intersection of said first object outline and said second object outline on the projection plane; and
   means for checking for a static collision between said first object and said second object at an end of said translational path.

12. A method for detecting collisions along a translational path, comprising the steps of:
   finding a first outline of a first object, and a second outline of a second object, and establishing a projection path along a translational path of a first object toward a second object;
   finding intersections-in-view with said first outline and said second outline according to projections of the first outline and second outline on a projection plane;
   checking for a static collision between said first object and said second object.

* * * * *